Figure 1:
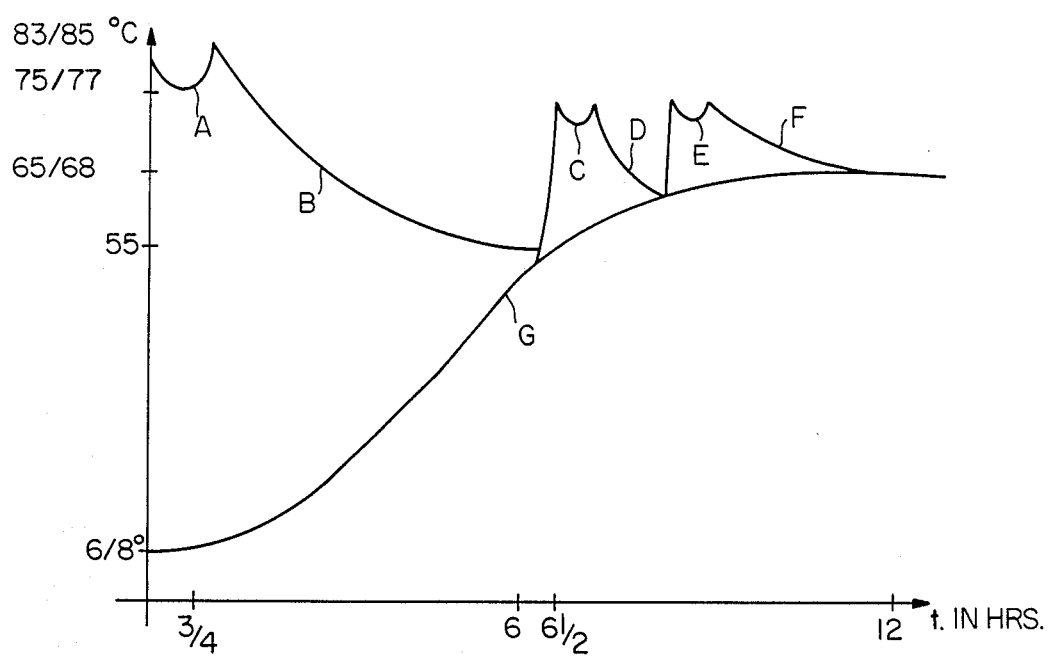

United States Patent [19]

Dreâno

[11] Patent Number: 4,752,490
[45] Date of Patent: Jun. 21, 1988

[54] PROCESS FOR COOKING MEAT PRODUCTS IN CONTAINERS

[75] Inventor: Claude Dreâno, Guillers, France

[73] Assignee: Armor-Inox SA, France

[21] Appl. No.: 767,774

[22] Filed: Aug. 20, 1985

[30] Foreign Application Priority Data

Aug. 28, 1984 [FR] France ................. 84 13405
Aug. 28, 1984 [FR] France ................. 84-13406

[51] Int. Cl.⁴ ................................ A23L 1/01
[52] U.S. Cl. .................... 426/523; 426/407
[58] Field of Search ........... 426/523, 509, 506, 407

[56] References Cited

U.S. PATENT DOCUMENTS

| | | | |
|---|---|---|---|
| 2,084,806 | 6/1937 | Hubenet | 426/523 |
| 3,152,911 | 10/1964 | Segur | 426/509 |
| 3,908,533 | 9/1975 | Fagerstrom | 99/386 |
| 4,256,775 | 3/1981 | Kunz | 426/509 |
| 4,505,192 | 3/1985 | Dreano | 426/506 |

FOREIGN PATENT DOCUMENTS 0070228 1/1983 European Pat. Off. .
710866 6/1954 United Kingdom .

*Primary Examiner*—George Yeung
*Attorney, Agent, or Firm*—Laff, Whitesel, Conte & Saret

[57] ABSTRACT

The process for cooking meat products in containers comprises five phases:
(a) putting a heat transporting liquid in contact with the products in their containers,
(b) remove the heat transporting liquid and let the products in their containers cool to a predetermined value,
(c) putting a heat transporting liquid in contact with the products,
(d) leaving the heat transporting liquid in contact with the products, the difference between the ambient temperature and the core temperature of the products being constant, and
(e) maintaining the ambient temperature constant until the desired core temperature is achieved.

4 Claims, 3 Drawing Sheets

PROCESS FOR COOKING MEAT PRODUCTS IN CONTAINERS

The present invention concerns a process and a cooking or cooling installation for food products such as hams. In the sequel, we shall consider that the cooking comprises the cooking operation itself, then the cooling operation allowing to return the cooked products to the normal temperature or a conservation temperature.

In the description which follows, we will consider in particular the cooking and the cooling of hams, but it should be understood that the process of the invention may have other applications, in particular curing processes.

In the European patent application No. 0 070 228, we have described a ham cooking process using heat connection and conduction between a calorie transporting fluid, on one hand, and the hams and their supports, on the other, in which we distinguish a number of successive phases:

a first phase lasting approximately 45 minutes, during which the heat transporting fluid is placed in contact with the hams and their supports, the temperature of the heat transporting fluid being of the order of 83°, a second phase of a duration of the order of four hours, during which the heat transporting fluid is removed, a third phase identical to the first, but of the order of 30 minutes, a fourth phase identical to the second, but of a duration of approximately 2.5 hours, a fifth phase identical to the third, and a sixth phase similar to the fourth, at the end of which a core temperature of 65° to 68° C. is attained, that is at the end of which the hams are cooked.

In the European patent application EP-A No. 0 070 228, we have also described a cooking installation comprising a heat transporting liquid heating station and a number of thermally shielded enclosures containing piles of ham molds or layers of wrapped hams separated by trays. A network of pipes is foreseen between the heating station and the enclosures, with water-gates allowing to selectively fill an enclosure from the central heating station or to empty it from the same central station. This installation is particularly useful when carrying out the cooking process described above.

The cooking experiments in accordance with the process of the European patent application mentioned above have shown that 65% of the calories needed for cooking were carried during the first phase.

In other respects, was described in the German technical article "Die Delta-T-Kochung - ein neuer Begriff" by J. E. Reichert which appeared in the journal "Die Fleischerei", 1980, No. 5, a differential cooking process in which the surrounding cooking temperature is, for example 25° C. higher than the measured core temperature, this temperature rising to reach a final value of 70° C. This process avoids in particular the damage caused by cooking at a constant temperature of between 65° C. and 70° C.

Finally, experience shows that when the ambient temperature goes above 50° C., it is preferable not to allow it to go down below this value before cooking is complete, because certain bacteria could then develop rapidly and degrade the quality of the ham.

In accordance with the present invention, is foreseen a different cooking process from the above-mentioned, in that after the first two phases, is foreseen a differential cooking phase, that is a phase during which the difference between the temperature of the heat transporting fluid soaking the hams and the core temperature of the hams is constant.

One aim of the present invention thus consists in foreseeing a cooking process which allies the advantage of the cooking process described in the above-mentioned European patent and that of differential cooking.

The installation described in the above-mentioned European patent application obviously allows the carrying out of this process. However, its network of pipes is relatively complex, as is the control of a number of water pumps and gates installed in the network.

That is why another aim of the invention consists in foreseeing a simpler installation, which allows, among other things a quasi-continuous operation.

In accordance with a characteristic of the invention, is foreseen a ham cooking process in which we distinguish the following phases:

a first phase lasting approximately 45 minutes, during which a heat transporting liquid is placed in contact with the hams and their trays, the temperature of the heat transporting liquid being of the order of 83° C.

a second phase during which the heat transporting liquid is removed and which lasts until the ambient temperature reaches a predetermined value, a third phase during which a heat transporting fluid, liquid or vapor, is placed in contact with the hams and their trays, the ambient temperature being maintained constant at the said predetermined minimum value, a fourth phase during which the said heat transporting fluid is left in contact with the hams and their trays, the difference between the ambient temperature and the core temperature being maintained constant, equal to a predetermined differential value, and a fifth phase during which the ambient temperature is maintained constant between 70° C. and 75° C., once it has reached this value during the fourth phase, the fifth phase ending when the core temperature reaches the desired temperature, that is 65° C. to 68° C.

In accordance with another characteristic, the said heat transporting fluid is water vapour.

In accordance with another characteristic, the said predetermined minimum value is 55° C.

In accordance with another characteristic, the said predetermined differential value is chosen in a range between approximately 5° C. to 20° C.

In accordance with another characteristic, is foreseen a cooking installation comprising a heat transporting liquid central heating station, a thermally shielded duct which is split into a series of separate compartments (and for the first and last on the outside) by gates, a number cooking containers loadable into piles of hams and movable by a transport system going across the series of compartments, the first compartment comprising a soaking vat connecting to the heating station and in which each entering container is soaked, the second compartment being empty of heat transporting fluid and the subsequent compartments having on their floor tubs of liquid provided with heating means, the temperatures assured by heating means in the tubs of liquid increasing in parallel with the core temperature of the hams.

In accordance with another characteristic, the transport system is a rail on which roll trolleys to which are suspended the cooking containers.

In accordance with another characteristic, the soaking vat is vertically mobile to, at the high position, submerge a container and, at the low position, allow the advancing of containers.

In accordance with another characteristic, the soaking vat is stationary and the suspending of each container is of variable length to, in the stretched position, lower the container into the soaking vat and, in the short position, assure the motion of the container.

In accordance with another characteristic the containers are perforated.

In accordance with another characteristic, the container is a parallelipiped perforated on all its surfaces except either the front or the back surface.

In accordance with another characteristic, the duct gates are of sliding type.

In accordance with another characteristic, the level of liquid in each vat is below the bottoms of the containers.

Figure 2:
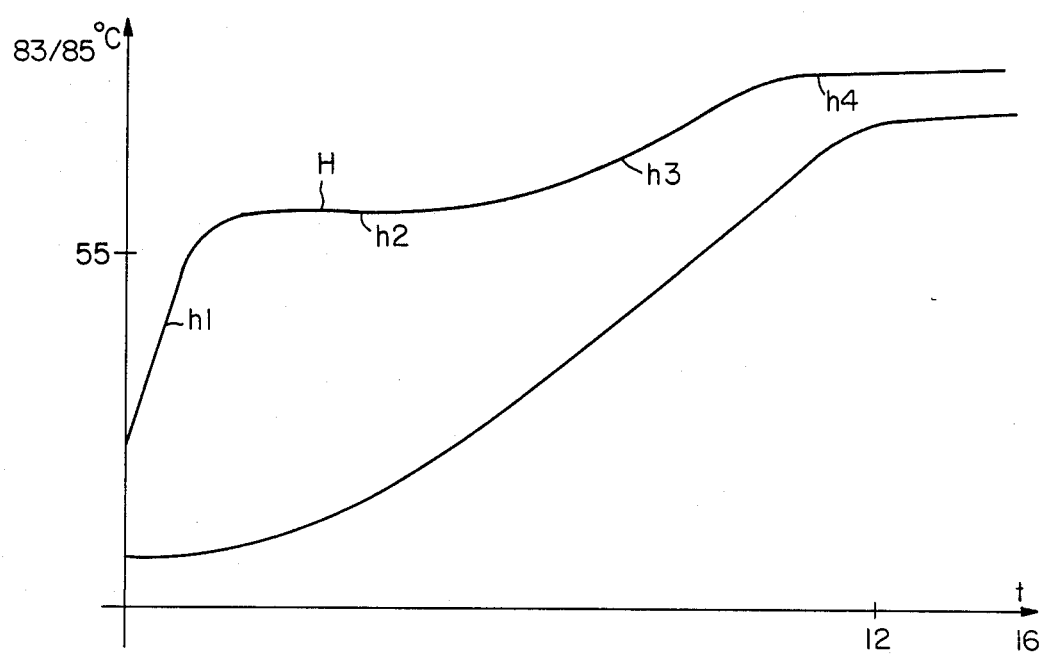
Figure 3:
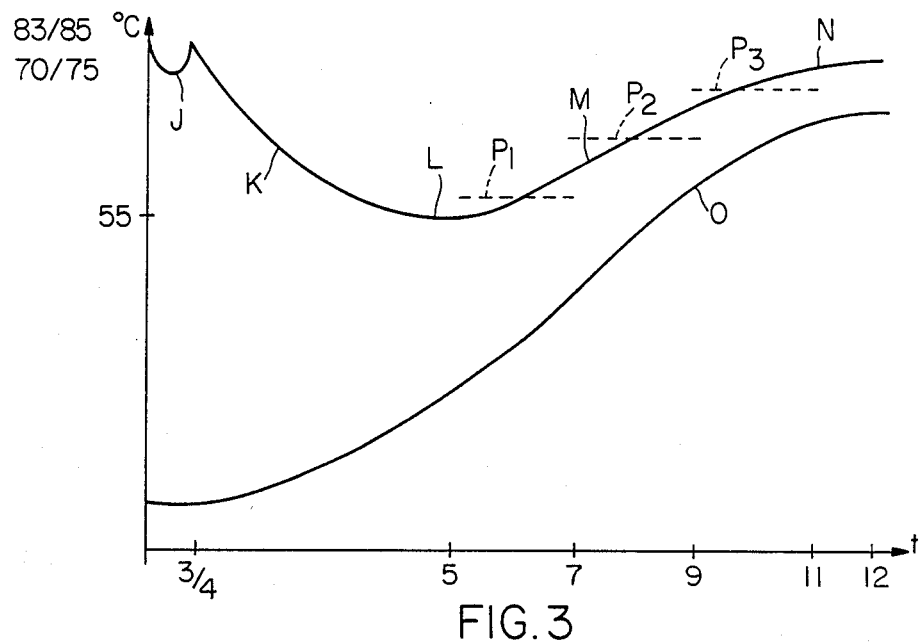
Figure 5:
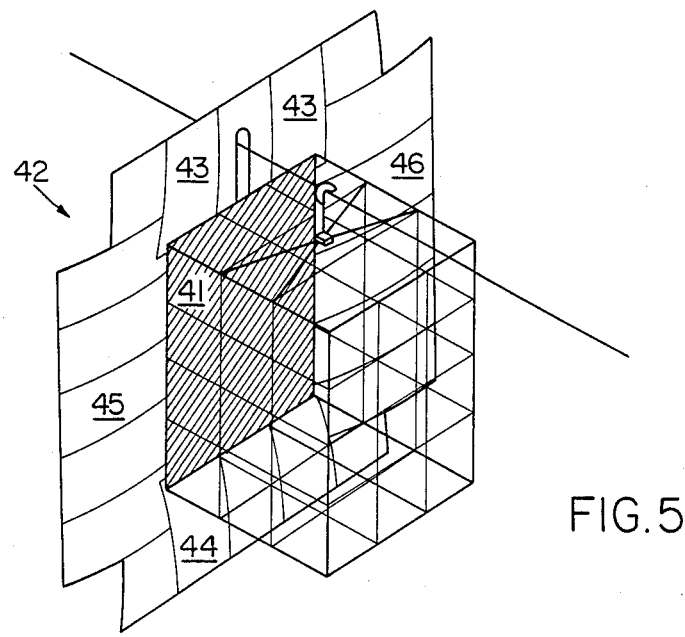
Figure 4:
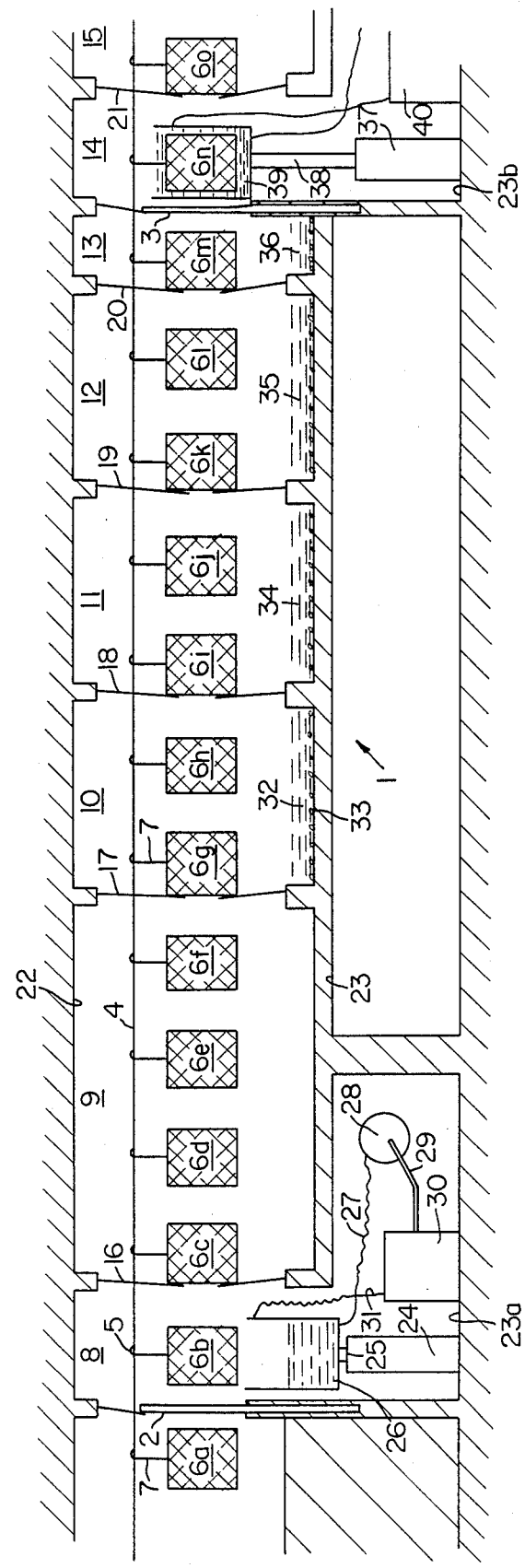

The characteristics of the above-mentioned invention as well as others will appear clearer upon reading the following description of different cooking processes and a realization example of the installation, the said description being done in relation to the attached drawings, among which:

FIG. 1 is a temperature-time diagram illustrating the known cooking process in accordance with the known European patent application No. 0 070 28, FIG. 2 is a temperature-time diagram illustrating the known differential or "delta T" cooking process, FIG. 3 is a temperature-time diagram illustrating the cooking process in accordance with the invention, FIG. 4 is a schematic vertical sectional view of an installation in accordance with the invention, and FIG. 5 is a perspective schematic view of a preferred realization of a container used in the installation of FIG. 2.

In FIGS. 1 to 3 the time in hours and fractions of hours is on the abscissa and the temperature is ° C. is on the ordinate.

In FIG. 1 which concerns the cooking process of the European patent application No. 0 070 228, curve A illustrates the variation in the liquid's temperature during the first cooking phase during which water is let in the cooking enclosure with continuous flow of the liquid between this enclosure and a buffer enclosure. We observe that, during a first time period the temperature drops because of the first contact with the hams and their cold trays, then rises due to the continuous flow of the liquid. The average temperature of the liquid oscillates between 85° C. and 83° C. This first phase lasts approximately ¾ of a hour.

Curve B illustrates the ambient temperature drop in the cooking enclosure once the liquid of the first phase has been completely removed. This second phase must end when the ambient temperature reaches approximately 55° C., a temperature below which the multiplication of certain bacteria increases considerably.

Curve C illustrates the variation in temperature of the liquid which is readmitted into the cooking enclosure, under identical conditions to hose of curve A, but at a slightly lower temperature of 80° C. to 78° C. This third phase lasts approximately ½ hour.

Curve D illustrates the temperature drop, once the liquid has been removed during a fourth phase, this drop having the same appearance as in the second phase, but being stopped before the ambient temperature drops below the core temperature.

Curve E illustrates a fifth phase analogous to the third and curve F illustrates a sixth phase analogous to the fourth.

Curve G illustrates the increase in the core temperature of the hams until the temperature reaches between 65° C. to 68° C., a temperature at which the ham is considered to be cooked. We observe that curve G has the appearance of an S.

The measurements carried out during cooking in accordance with the process of FIG. 1 have shown that during the first phase, 65% of the necessary calories for the cooking have already been brought.

In FIG. 2 which concerns the differential cooking process, curve H illustrates the increase in ambient temperature and curve I the increase in core temperature. In curve H, we observe a first part h, showing a rapid temperature increase to reach a temperature slightly above 55° C., a flat part $h_2$, a third increasing part $h_3$, parallel to the core temperature, and fourth flat part $h_4$ which ends when the ham is cooked. The curve I has the same S shape as curve G of FIG. 1.

Given that, along the curves h, and $h_2$, the ambient temperature is lower than or equal to 55° C., the time duration for curve I to reach this temperature is much longer than is the case of FIG. 1.

In FIG. 3 which concerns the cooking process in accordance with the invention, curve J illustrates the temperature variation of the heat transporting fluid during the first cooking phase which is identical to that which corresponds to curve A of FIG. 1.

Curve K like curve B of FIG. 1 illustrates the drop in ambient temperature.

Curve L illustrates an ambient temperature phase similar to curve $h_2$ of FIG. 2.

Curve M like curve $h_3$ of FIG. 2 illustrates the increase in ambient temperature during the differential cooking phase.

Curve N like curve $h_4$ of FIG. 2 illustrates the last phase at maximum ambient temperature.

Curve O illustrates the increase in core temperature.

The advantages pertaining to the process of this invention illustrated in FIG. 3 compared to those illustrated in FIG. 1 are mainly due to the reduced number of filling and emptying operations. The high number found in the process of FIG. 1 leading to a multiplication of water-gates and water-gate switching operations which could only be mastered by complex control equipment and thus expensive.

The principal advantage with respect to the process illustrated in FIG. 2 is the reduced cooking time.

After cooking, the cooked hams can be cooled by submerging them in a vat of circulating water at close to 0° C. for ¾ hour. The water is then removed from the vat and the core temperature continues to decrease during for example 4 to 5 hours. At the end of this cooling phase, which is symmetrical to phase J, K of FIG. 3, 65% of the heat removal necessary for cooling has been achieved. The cooling can then continue in a natural manner within a relatively cool enclosure.

The installation of FIG. 4 is foreseen to realize cooking in accordance with the process of the invention, as well as to start the cooling of the cooked products.

The installation of FIG. 4 comprises a cooking duct 1 provided with an entrance gate 2 and an exit gate 3. A transport rail 4 passes through the duct 1. Trolleys 5, under which are suspended containers 6a to 6o loaded with filled ham molds, can roll on rail 4. These are preferably, at least partially of lattice type, that is they are not watertight. Before entering the duct, each container, such as 6a, is suspended to a trolley 5 by a suspension 7. To have the containers advance under the rail 4, we assume that the suspensions are connected by a link to a not illustrated motorized cable under the rail 4.

The duct 1 is divided into eight compartments 8 to 15 which are respectively separated by gates 16 to 21.

In a general manner, the duct 1 is limited by a ceiling 22, a floor 23 and lateral walls, not shown in FIG. 2. In the first compartment 8, the level of floor 23a is lower than the central part of floor 23. A vertical screw-jack 24 whose shaft supports an immersion vat 26 open at the top is mounted on floor 23a. The vat 26 has a liquid input which is connected by a flexible pipe to the output of a pump 28. The input of pump 28 is connected by a pipe to a heating station 30. The vat 26 also has an overflow outlet which is connected by a flexible pipe 31 to an input of the heating station 30.

The second compartment 9 is a simple insulated watertight room.

The third compartment is foreseen to have a vat containing 10 to 20 cm of water. In vat 32 are foreseen heating elements which are, for example, electrical resistors. In an analogous manner, in the bottoms of compartments 11 to 13 are foreseen vats 34 to 36 containing water heated by heating elements analogous to elements 33. In practice, a water vapour atmosphere whose temperature is controlled in relation to the heat supplied by the elements 33 exists in each compartments 10 to 13.

The compartments 8 to 13 form that part of the duct in which the cooking is carried out. That is why, above, we have called the gates 2 and 3, one of which closes the front of the compartment 8 and the other the back of the compartment, inlet gate and outlet gate. Beyond gate 3 in compartment 14, the level of floor 23b is at the same level as floor 23a. A vertical screw jack 37 whose shaft 38 supports an immersion basin 39 open at the top is mounted on floor 23b. The basin 39 is connected to a cold water station 40 by a pump, which is not shown, and pipes analogous to those which connect 26 and 30.

The compartment 15 may be an insulated compartment like compartment 9, but this is not necessary.

The containers 6a to 6o are at equal distances on rail 4 and advance by one step each hour, each displacement being done in a short time of the order of 1 to 2 minutes. We conclude that the length of stay in each of the compartments 8 to 14 are respectively 1 hour, 4 hours, 2 hours, 2 hours, 2 hours, 1 hour and 1 hour.

The gates 2 and 3 are, preferably, sliding gates whose top edge is in low position below the bottom of the containers and in high position just below rail 4. Each of these is completed, for the part existing between the ceiling and rail 4 by flaps. The gates 2 and 3 and their flaps limit the hot portion of the duct and are thus made of a material with a very good thermal insulating coefficient.

The gates 16 to 21 can each be made up of above, lower and lateral flaps. We shall describe in greater detail such a gate in relation to FIG. 5. In other respects, these gates separating compartments whose temperature differences are relatively small, can be made from a relatively common insulating material.

In compartment 8, the basin 26 contains water or even better cooking broth at approximately 83° C. In FIG. 4 the basin 26 is shown in the low position. In practice, as soon as container 66 is in location, the screw-jack 24 raises basin 26 until the container becomes completely submerged. In the low position, the water which remains in 26 is just sufficient to cover the container. Immediately after submersion, the pump 28 is started to bring water a 83° C. from the heating station 30. The water overflows in 26 and returns to the central 30 by 31. In practice, additional flaps are foreseen for example to allow the emptying of basin 26. After a period of approximately ¼ hour, the pump 28 is stopped and the screw-jack 24 lower the basin 26. During the next ¼ hour, before passing into compartment 9, the hams contained in 6b, continue to cook by thermal inertia. We could also control the raising of basin 26 only ¼ of an hour after container 6b has entered into 8. We can conclude, that in compartment 8, the hams are subjected to the cooking corresponding to part J of the external temperature curve of FIG. 3.

The containers 6c to 6f stay 4 hours in compartment 9 where their external temperatures, as well as that of their supports describe the k part of the curve of FIG. 3.

In compartment 10, the outside temperature of the hams and their supports is adjusted above 55° C. by controlling the water temperature in vat 32 by adding heat through the elements 33.

In compartmenmts 11 and 12, the ambient temperature is increased in steps to guarantee a Delta-T cooking with respect to the core temperature. The temperature of the steps are controlled by those of the elements in vats 34 and 35. In practice, the installation allows the approximation of the parts L and M of FIG. 3 through three steps P1, P2 and P3 which guarantee a Delta-T cooking with sufficient precision. It must be understood that, if we desire a greater precision, we can subdivide the compartments 10 to 12 into six compartments. We can also vary the temperatures through setting of the elements.

In compartment 13, the external temperature of the hams and their supports follows part N of the curve of FIG. 3. The temperature of vat 36 can vary to follow exactly this curve or also be constant to approximate it. At the exit of compartment 13, the core temperature of the hams has reached 65° C., that is the fully cooked temperature. In practice, while passing through duct 1, the core temperature follows curve O of FIG. 3.

The basin 39, in compartment 15, contains water at approximately 2° C. As soon as container 6n is in location, the jack-screw 37 raises basin 39, which had been lowered to allow the entrance of the container. We observe a similar operation to that which was described regarding the processing in compartment 8, but here the cooling station 40 is at 2° C. and the immersion may last 1 hour. The containers 6, at the exit of 14, can be stockpiled. The core temperature then varies symmetrically with respect to the beginning of curve O, FIG. 3, that is that at the end of 5 hours, it will be approximately 30° C. or 25° C. The hams can then be placed in a conventional cold room where they can be preserved.

Obviously, between compartment 13 and compartment 14, we can also foresee a stockpiling or buffer compartment. However, it should be understood that after having successfully reduced the cooking time to approximately 10 hours by using the cooking process shown in FIG. 3, the cooling must also be carried out in the shortest time to reduce the size of the stockpiling area. The installation of FIG. 4 meets this requirement.

In FIG. 5, we have shown a preferred container 6 example, that is of one of the containers 6a to 6o. The container 6 is a parallelipiped whose rear vertical side is full while its five other sides are meshed. When a container is at standstill in the duct 1, except in 8 or 14, the full rear vertical side 41 cooperates with the flexible partition 42, that is one of the partitions 16 to 21, to achieve the water-proofing from one compartment to another. For this purpose, the flexible partition 42 is made up from soft vertical blades 43, directed towards the bottom, and 44, directed towards the top, and horizontal blades 45, directed to the left, and 46, directed to the right. Each blade has an end tied to the frame of the opening separating two compartments and one loose end directed towards the interior of this opening. The loose ends of blades 43 to 46 delineate a rectangle whose dimensions are slightly less than those of the full face side 41 of the container. Thus, during the motion of the container 6, in the direction of the arrow F, on rail 4, the container 6 goes through the said rectangle by spreading the blades 43 to 46. The container overtakes the partition by such a distance that the blades regain their initial position. Then the container is brought back a bit to lie against the blades, without spreading them, as shown in FIG. 5. An efficient waterproofing is thus obtained.

The purpose of foreseeing a full rear side comes from the fact that the length of the blades can be reduced compared to that which would be required with a meshed side 41. Some of the long blades could remain hooked to the container after its transition, thus destroying the waterproofing between adjacent compartments. This inconvenience is eliminated with the full side 41 and the short blades in the example of FIG. 5. We should note that the drawing of FIG. 4 illustrates the case of using the container and the flexible door of FIG. 5.

Of course, instead of the rear side, we can foresee the front side of the container to be full.

The duct of FIG. 4 is shown to be linear, but could have any shape, for example straight or in the form of a horse shoe. In other respects, between the heating station 30 and the cooling station 40, we can foresee a heat pump which allows a reduction in the consumed energy.

The embodiments of the invention in which an exclusive property or privilege is claimed are defined as follows:

1. A process for cooking meat products in containers, said process comprising the following steps:
    in a first step lasting approximately 45 minutes, placing a heat transporting liquid in contact with the products in their containers, the temperature of the heat transporting liquid being of the order of 83° C.,
    a second step of removing the heat transporting liquid from the products in their containers and allowing the products to cool until the ambient temperature reaches a predetermined minimum value,
    a third step of placing the heat transporting liquid in contact with the products in their containers, the ambient temperature being maintained constant at the said predetermined minimum value,
    a fourth step of leaving said heat transporting liquid in contact with the products in their containers, the difference between the ambient temperature and the temperature in a center of the meat product being maintained constant, and equal to a predetermined differential value, and
    a fifth step while continuing said contact of said products in their containers with said heat transporting liquid of maintaining the ambient temperature constant between 70° C. and 75° C., once this temperature has been reached during the fourth step, the fifth step ending when the temperature in the center of the meat product has reached 65° C. to 68° C., thereby cooking said product.

2. A process in accordance with claim 1 wherein the said heat transporting liquid is water.

3. A process in accordance with claim 1 or 2, wherein the said predetermined minimum value is 55° C.

4. A process in accordance with one of claims 1 or 2 wherein the said predetermined differential value is chosen in a range going from approximately 5° C. to 20° C.

* * * * *